June 27, 1950

R. L. WILSON 2,513,222

CONTROL APPARATUS

Filed Oct. 21, 1949

INVENTOR.
ROSSER L. WILSON
BY Wallace and Cannon
ATTORNEYS

June 27, 1950

R. L. WILSON 2,513,222

CONTROL APPARATUS

Filed Oct. 21, 1949

INVENTOR.
ROSSER L. WILSON
BY Wallace and Cannon
ATTORNEYS

June 27, 1950

R. L. WILSON 2,513,222

CONTROL APPARATUS

Filed Oct. 21, 1949

INVENTOR.
ROSSER L. WILSON
BY Wallace & Cannon
ATTORNEYS

Patented June 27, 1950

2,513,222

UNITED STATES PATENT OFFICE 2,513,222

CONTROL APPARATUS

Rosser L. Wilson, Mahwah, N. J., assignor to American Brake Shoe Company, Wilmington, Del., a corporation of Delaware Application October 21, 1949, Serial No. 122,773

18 Claims. (Cl. 318—74)

This application is a continuation in part of my copending application, Serial No. 72,169, filed January 22, 1949, now abandoned.

This invention relates to control apparatus for use in governing the relative speeds of moving parts of machinery such as shafts and the like, and particularly it relates to such control apparatus for establishing and maintaining a substantially synchronous or other desired speed relationship between two or more such moving parts such as two or more rotating shafts which otherwise would operate independently of each other.

The need for control apparatus of the aforesaid character may arise in any situation where it is desirable that the variantly adjustable operating speed of a particular member, such as a shaft, serves as a standard with which the operating speed of one or more other independently driven shafts or the like is to be correlated. In such instances the shaft which is to constitute the standard may serve merely as a variable speed control shaft for one or more engines, motors or the like, or it may constitute the shaft of a master engine or motor of a group of two or more similar engines or motors which are to be operated in a correlated relationship.

The use of one or more engines as the driving power for an airplane affords one typical situation where control apparatus of the aforesaid character is desirable, for whether the airplane be driven by a single engine, or by two or more similar engines, the maintenance of the desired speed of operation in such engine or engines is extremely difficult because of the rapid and extremely wide variance of the factors such as wind resistance, attitude of flight or the like, which affect and vary the operating speed of such engine or engines. Thus, in a single engine airplane, a variable speed electric motor may be used as a standard from which the speed of operation of the single engine may be automatically governed by control apparatus of the aforesaid character; while in an airplane having a plurality of engines, such control apparatus may serve to coordinate the speed of all of the engines with the speed of such a variable speed electric motor, or if desired, a particular one of the engines may serve as the variable standard of speed, and such control apparatus may serve to coordinate the speed of the other engines with the one engine which in such an event constitutes the standard or master engine. It is therefore an object of this invention to enable automatic yet adjustable control of the speed of one or more engines to be attained more rapidly than heretofore, and in such a manner that control of the speed thereof is simplified and rendered more accurate, and if desired the control of the speed of all of the engines of a multi-motored airplane may be adjusted through manipulation of but a single control means.

Where such control apparatus is used as aforesaid to control the operating speed of one or more airplane engines, it is of course desirable that the apparatus be rugged in character, relatively light in weight, and dependable and accurate in its operation or correlation of the secondary shafts or engines with the master shaft, and in the patents, to Wilson No. 2,232,753, patented February 25, 1941, and Nos. 2,443,437 and 2,443,438, patented June 15, 1948, several forms of control apparatus are disclosed which meet these fundamental requirements. It is, however, an important object of this invention to enable further improvement of the operating characteristics of such control apparatus to be attained, and to enable the desired accuracy of speed correlation or control to be attained extremely rapidly under the many varying circumstances which may involve variations in the nature of the equipment to be controlled as well as varying conditions of use.

Control apparatus of the aforesaid character attains the desired speed correlation through the control of power operated speed adjusting mechanism which, upon detection of undesired speed variance, acts to adjust the speed of the secondary shaft or the like in such a sense as to tend to re-establish the desired speed relationship. As a practical matter, the power operated speed adjusting means may be arranged to attain the speed adjustment in different ways which are determined to a great extent by the field in which the apparatus is used. For example, in an airplane engine, the speed may be varied by adjustment of the pitch of the propeller driven thereby, or by adjustment of the fuel supply means such as a carburetor, or by adjustment of other means which affect engine speed. Where resort is had to the adjustment of the propeller pitch, the power means for operating the same may in many instances constitute a standardized part of the equipment to which the control apparatus as a whole must be related and adapted so as to attain the desired accuracy of speed correlation.

In the operation of control apparatus of the kind to which this invention relates, the detection of an undesired speed variance by the detecting means of the apparatus causes a control impulse to be transmitted to the speed adjusting means of the shaft which is being controlled thereby, and the characteristics of such control impulses, such as the length and frequency thereof, have a controlling influence upon the operation of the speed adjusting means and its effectiveness in re-establishing the desired speed relationship. Thus, when different speed adjusting means are encountered, the characteristics of the control impulses transmitted thereto by the control apparatus must be suited to the characeristics of the particular speed adjusting means in order that such speed adjusting means may accomplish the desired speed correlation, and to enable this to be readily accomplished is an important object of this invention. Objects related to the foregoing are to simplify the interrelationship or matching of the detecting means and the speed adjusting means in control apparatus of the foregoing character, and to enable this to be done so as to assure rapid correction of the detected speed difference while assuring against over-correction.

In the control apparatus disclosed in the aforesaid patents, the detection of the undesired speed differential between a master shaft and one or more secondary shafts is accomplished through commutator switch devices associated with the respective shafts so as to compare the speeds of the master and secondary shafts and transmit energizing impulses in succession along different electrical paths to associated relay switch mechanism, and this relay switch mechanism, in accordance with the order or sequence in which such impulses are received from such electrical paths and in accordance with the time spacing of such impulses, is operable to determine whether the speed differential between the compared shafts exceeds the allowable tolerance and in which sense a corrective adjustment must be applied to the secondary shaft to reestablish the desired speed relationship; and upon such determination one or more control impulses are transmitted in succession to the speed adjusting means to cause corresponding periods of corrective speed adjustment in the required direction or sense. The relay switch mechanism of the aforesaid patent is such that it includes a first or master relay which is of the slow-to-release type, and when a speed differential between the two compared shafts causes this relay to be momentarily energized, the contacts of this master relay remain closed for a predetermined delay period determined by the release time of the relay. Two secondary relays are also included in the aforesaid relay switch mechanism, and depending on the sense of the existing speed variance or differential, a circuit to one of these secondary relays may next be closed through the commutator switches. If such circuit closure takes place during the delay period of the slow-to-release or master relay, the corresponding secondary relay will be actuated, and during the balance of the release period of the master relay a control circuit will be completed to the speed adjusting means to cause operation thereof in the proper sense or direction.

The maintenance of the speed relationship of a master shaft and a secondary shaft within a predetermined tolerance by control apparatus of the character to which this invention relates is of course dependent upon the ability of the detecting means of such apparatus to detect relatively small variations in the speed relationship of such shafts, to thereby enable correction to be made before the speed differential becomes objectionably large, and in the control apparatus of the aforesaid patent, the sensitivity of the apparatus to small speed diffeernces may be increased by increasing the release time of the master relay of the switch mechanism. Under many conditions resort may be had to such increase or other adjustment of the release time of the master or slow-to-release relay to attain the desired sensitivity of the apparatus, but in the application of the control apparatus to different types of mechanism, conditions may arise where the extended period of closure which is necessary for the master relay in order to attain added sensitivity will so extend the period of corrective adjustment as to cause over-correction which can not be detected until after the master relay has released. In the aforesaid Wilson Patents Nos. 2,443,437 and 2,443,438, means are disclosed which enable the normal release time of the master relay in control apparatus of the foregoing character to be materially extended without destroying or objectionably limiting the ability of the apparatus to detect reversal of the sense of relative rotation of the two shafts. Thus, the apparatus disclosed in the aforesaid Wilson Patents Nos. 2,443,437 and 2,443,438 enables the normal release time of the master relay of such control apparatus to be relatively long so as to impart extreme initial sensitivity to the apparatus, and yet enables such release time to be reduced as an incident to the detection of a speed difference which requires correction, thereby to minimize over-correction and render the apparatus more quickly sensitive to reversal of the sense of relative rotation of the two shafts.

While control apparatus of the kind to which this invention relates operates under normal service conditions to maintain the speeds of the compared members or shafts within the operating tolerance for which the apparatus is designed, it must be recognized that circumstances may arise where the speed difference is relatively great, and to enable such apparatus to quickly establish or reestablish the desired speed relation under such conditions without danger of over-correction is a further object of this invention. When such a great speed differential is present it is usually quite important that the desired speed relationship be reestablished as rapidly as possible, and to enable this to be accomplished in control apparatus which operates within a small tolerance is another important object of the invention, and a further and related object of the invention is to enable the correction of the speed of the secondary shaft to proceed continuously until the existing speed differential has been reduced to a relatively small amount, and to thereafter complete the synchronization by a series of corrective adjustments that are relatively small and substantially proportional to the instantaneous speed differential.

Other and more specific objects of the invention are to enable sensitivity of detection to be retained in an apparatus of the aforesaid character while at the same time enabling constant or continuous adjusting operations to be utilized in combination with spaced and relatively short adjusting operations so as to assure prompt and rapid readjustment while preventing over-correction. Other objects are to minimize the number of adjusting periods required to reestablish the desired speed relationship and to accomplish this in such a way that hunting will be avoided.

Under some operating conditions, it is desirable to limit the range of automatic operation of control apparatus of the general character above discussed, and to provide for manual control of the adjusting apparatus so long as the speed differential remains outside of the aforesaid limited range, and to enable this to be accomplished in a simple manner is still another object of the present invention. More specifically, it is an object of the present invention to afford means for detecting speed variances beyond the predetermined range, and to enable such means to automatically cut out the automatic operating characteristic of the present control apparatus. A further object is to afford control apparatus that may readily and easily be controlled manually when the automatic operation thereof has been cut out by reason of an excessive speed variation.

Other and further objects of the present invention will be apparent from the following description and claims and are illustrated in the accompanying drawings which, by way of illustration, show preferred embodiments and the principle thereof and what is now considered to be the best mode of applying that principle. Other embodiments of the invention embodying the same or equivalent principle may be used and structural changes may be made as desired by those skilled in the art without departing from the present invention and purview of the appended claims.

In the various embodiments of the invention chosen for disclosure herein the invention is particularly adapted for governing the speed of one or more engines of an airplane, but it will be recognized that these embodiments of the invention are of general utility, and may be effectively employed in any circumstance where correlation of the speeds of two or more rotating and independently driven shafts is desired. Thus in the embodiment of the invention illustrated in Fig. 1 of the drawings, a pair of shafts 20M and 20—1 are shown, and means are provided for correlating the speeds of these shafts so that one of the shafts, as the shaft 20M, constitutes the master shaft, and the other shaft 20—1 is maintained at a speed which bears a predetermined relationship to the master shaft 20M. This predetermined relationship may, as in the present case, be a substantially synchronous relationship, or, by the use of means such as gearing, any other desired speed relationship between two or more shafts or the like may be maintained.

In the attainment of the desired speed relationship between the shafts, the master shaft 20M is driven at the desired speed by driving means such as a variable speed controlling element 21 which may take any desired form such as a variable speed electric motor or a variable speed engine. Thus, as illustrated in Fig. 1 of the drawings, it is contemplated that the master shaft 20M will serve merely as a standard or master shaft with which the speed of the other or secondary shaft 20—1 is to be correlated, and hence the variable speed controlling element 21 may be in the form of a relatively small variable speed electric motor.

Figure 1:
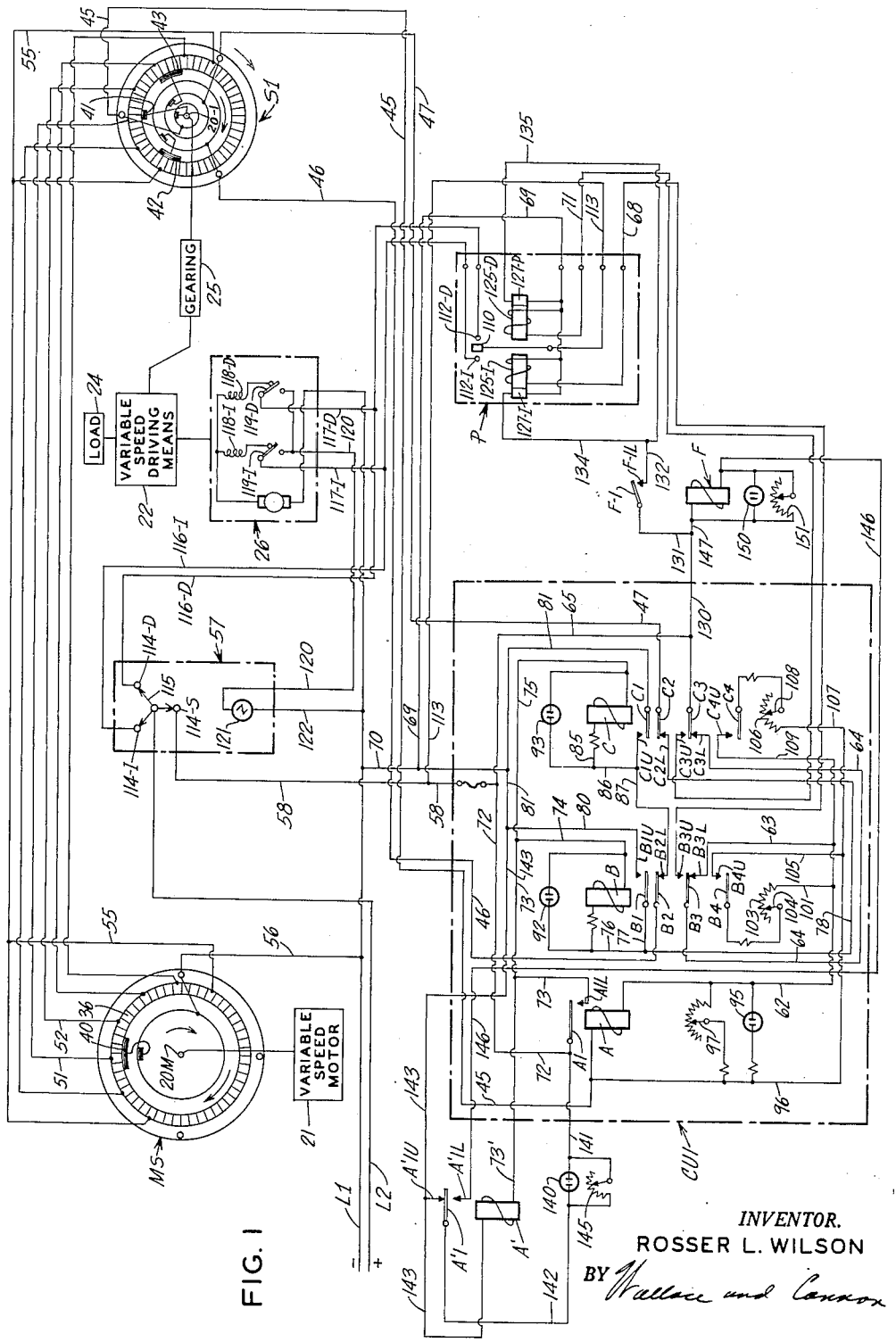
Fig. 1 is a schematic wiring diagram illustrating a control apparatus embodying the invention.

The secondary shaft 20—1 may be driven by an individual variable speed driving means, such as the internal combustion engine indicated at 22 in Fig. 1, which may take the form of an airplane engine operating through its main shaft to drive a load 24 such as an airplane propeller. The drive from the engine shaft to the related shaft 20—1 may, of course, be direct, or as in the present instance, may be attained through gearing 25. The speed of each such engine, and hence of the associated shaft as 20—1, may be varied by adjustment of the load or the propeller pitch, or by adjustment of the fuel supply means, and this may be accomplished by operation of conventional speed governing means such as the mechanism of a variable pitch propeller, or by operation or adjustment of the fuel pump or carburetor of the engine. Thus in Fig. 1 of the drawings, such governing mechanism is of such a character as to be electrically operable and is indicated generally as 26, and it is by automatic operation or adjustment of such governing mechanism 26 that the desired correlation of the secondary shaft 20—1 with the master shaft 20M is attained under the present invention. The governing mechanism 26 is, of course, adjustable in two directions so as to enable the speed of the secondary shaft 20—1 to be increased or decreased in accordance with the sense of the variance between the speeds of this shaft and the master shaft 20M, and such actuation may be effected in different ways as, for example, by a reversible electric motor forming part of the adjusting means 26.

The mechanism which has thus been described for driving the secondary shaft 20—1, and for adjusting the speed at which the shaft 20—1 is driven, may be said to constitute a driving and speed adjusting unit for the secondary shaft 20—1, and similar driving and speed adjusting units may be similarly associated with additional secondary shafts in the manner disclosed in the aforesaid Wilson Patents Nos. 2,443,437 and 2,443,438.

Under the present invention the speed of the secondary shaft 20—1 is compared with the speed of the master shaft 20M to detect the presence and sense of any undesired variance between the speed of the secondary shaft and the master shaft, and upon such detection of undesired speed variance, the speed governing means of the associated engine 22 is adjusted in a controlled manner in the direction required to reestablish the desired speed relationship. In accomplishing such adjustment, an individual control unit CU—1 is provided which governs the operation of the speed adjusting means 26, and such control unit CU—1 is, in turn, associated with detecting means whereby the speed of the secondary shaft 20—1 is compared with the speed of the master shaft 20M, and such detecting means include a plurality of commutator switches MS and S—1 associated respectively with the shafts 20M and 20—1. Each such commutator switch includes a circularly arranged series of commutator bars 36 and one or more brushes adapted for cooperation with such commutator bars 36. As shown in Fig. 1, the commutator bars 36 constitute the stationary parts of the switches, while the rotating parts of the switches are afforded by the brushes thereof, and hence the brushes of the respective commutator switches are arranged to be driven by the shafts with which their commutator switches are associated. Thus, the master commutator MS has a single brush 40 driven by the shaft 20M, while the commutator switch S—1 has three angularly spaced brushes 41, 42 and 43 driven as a unit from the secondary shaft 20—1.

The three brushes 41, 42 and 43 of each secondary commutation switch, as S—1, are associated with the related control unit, as CU—1, by means including wires 45, 46 and 47, which are extended respectively from the brushes 41, 42 and 43 through conventional slip ring connections, and selected commutator segments of the secondary switch are so connected with selected segments of the master commutator MS that when the speed of a secondary shaft varies so as to cause relative rotation to exist between that shaft and the master shaft 20M, circuits will be established to the wires 45, 46 and 47 in a sequence which depends upon the sense of such relative rotation and at a frequency dependent upon the magnitude of such relative rotation. In attaining this result, every fourth one of the commutator bars 36 of the master commutator MS is utilized for association with the commutator switch S—1 and is electrically connected to a correspondingly positioned one of the commutator bars of the secondary commutator switch. This enables the master commutator switch to be associated with four secondary commutator switches in the manner disclosed in the aforesaid Wilson Patents Nos. 2,443,437 and 2,443,438. Thus, the upper bar 36 just to the left of the vertical center line of the master commutator MS is connected by a wire 51 to the correspondingly positioned commutator bar of the commutator switch S—1; and the fourth bar 36 of the master commutator MS, in a clockwise direction, is connected by a wire 52 to the correspondingly positioned bar of the commutator switch S—1; and similar connections are afforded for the other corresponding commutator bars of the switches MS and S—1. In the present instance the commutator bars in each commutator are so arranged that each bar 36 is electrically connnected to the diametrically opposite commutator bar, as by wires 55. The other connections between the master commutator and the secondary commutator are made in the manner described so that, within 180° of the circumference of each secondary commutator, six equally spaced commutator segments are connected to correspondingly positioned bars of the master commutator.

Where diametrically opposite commutator bars are electrically interconnected as in the embodiment shown in Fig. 1, the brushes 41, 42 and 43 of the secondary commutator switch S—1 are arranged so as to lie entirely within 180° of the circumference of the commutator, and each of these brushes, as well as the brush 40 of the master commutator, has an angular or circumferential extent which is just equal to or is less than the combined angular extent of four commutator bars. This assures completion of the circuits to the wires 45, 46 and 47 in the desired manner, and avoils false indications of relative rotation or sense of such relative rotation.

To provide for such completion of electrical circuits through the respective brushes 41, 42 and 43 and the master brush 40, the master brush 40 is connected by means including a wire 56 to one line wire L—1 of a direct current source, and the wires 45, 46 and 47 from the secondary commutator switch S—1 are extended to the related control unit CU—1 which is in turn associated with the other line wire L—2 of the source through a manual control switch 57 and a wire 58, as will hereinafter be described, so that closure of circuits by the commutators will serve to energize elements of the relay unit, as will hereinafter be explained Thus, the contact unit CU—1 has a master relay A that is of the slow-to-release type, as will hereinafter be described; a second relay A', Fig. 1, that is connected to and controlled by the relay A for purposes which will be discussed in greater detail hereinafter; and a pair of secondary relays B and C that are operable in cooperation with the relay A in the general manner described in my aforesaid Patents Nos. 2,232,753, patented February 25, 1941, and 2,443,437 and 2,443,438, patented June 15, 1948, to respond to the sequence of electrical impulses transmitted through the wires 45, 46 and 47 by the commutators MS and S—1 to determine the sense of diretcion of relative rotation of the shafts 20M and 20—1, and which also respond to the frequency or time spacing of such impulses to detect and institute correction of speed differences in excess of a predetermined amount or tolerance. In affording the energizing circuit for the main relay A, the wire 45 is connected to one terminal of the relay A, and the other terminal has a wire 62 extended therefrom so as to be connected to the line wire L—2 through contacts of the relays B and C, as will hereinafter become apparent.

The relay A has a movable contact A—1 that is normally in an upper position, and when the relay A is operated, the contact A—1 is moved downwardly and is engaged with a lower stationary contact A—1L.

The relay A' also has a movable contact A'1, this latter contact being normally engaged with an upper contact A'1U, and when the relay is operated, the contact A'1 is separated from the contact A'1U and is moved down into engagement with a lower contact A'1L.

The relay B has four movable contacts B—1, B—2, B—3 and B—4, the contact B—1 being normally open and being arranged to engage a stationary contact B—1U when the relay B is operated. The contact B—2 is normally engaged with a stationary contact B—2L and is disengaged therefrom when the relay B is operated. The contact B—3 is disposed between upper and lower stationary contacts B—3U and B—3L, and is arranged normally to engage the contact B—3L and to be moved out of such contact and into engagement with the contact B—3U when the relay B is operated. The contact B—4 is disposed beneath and normally out of engagement with a stationary contact B—4U, and is moved into engagement therewith upon operation of the relay B.

The relay C has movable contacts C—1, C—2, C—3 and C—4 that correspond with the contacts of relay B. Thus the contacts C—1 and C—4 are arranged so as to be in normally spaced relation to stationary contacts C—1U and C—4U, respectively, and when the relay C is operated, the contacts C—1 and C—4 are engaged with the respective contacts C—1U and C—4U. The contact C—2 is normally engaged with a stationary contact C—2L, and is separated therefrom upon operation of the relay C. The contact C—3 is disposed between upper and lower contacts C—3U and C—3L, and is normally engaged with contact C—3L so as to be separated therefrom and engaged with contact C—3U upon operation of the relay C.

The operating circuit for the relay A is extended from the wire 62 by a wire 63 to the contact B—3L, and a wire 64 connects the contact B—3 to the contact C—3L, so that a wire 65 extended from the contact C—3 to the wire 58 serves to afford the complete energizing circuit for the relay A back to the live wire L—2 through the manual switch 57. With this arrangement, the operation of the relay B or the relay C serves to break the energizing circuit for the relay A and prevent energization of the relay A while such secondary relay remains operated. When the relay B is thus operated, the shifting of the contact B—3 into engagement with the contact B—3U serves to extend circuit from the line wire L—2 to the contact B—3U and thence through a wire 68 to one of the direction determining terminals of a power relay P that controls the electrically operated speed adjusting means 26, the common terminal of the relay P being connected by wires 69 and 70 in series to the line wire L—1. Similarly, the other direction determining terminal of the power relay P is connected by a wire 71 to the contact C—3U, so that operation of the relay C completes a circuit which operates the power relay P in an opposite direction. The contacts B—3U and C—3U thus constitute the primary control contacts for the power relay P and hence for adjusting means 26 so that such control of the adjusting means 26 is attained through intermediacy of the power relays P.

The relays B and C are so arranged that they may be energized only when the main relay A is in its operated condition, and for this purpose a wire 72 extends from the wire 58 to the contact A—1, and a wire 73 is extended from the contact A—1L and has branch leads 74 and 75 extended, respectively, to one terminal of the windings of the relays B and C. The other terminal of the winding of the relay B is connected by wires 76 and 77 in series to the contact B—1, and a wire 78 is extended from the wire 76 to the contact C—2L. The contact C—2 is connected to the wire 47 so that when the relay A is in its operated condition, an impulse applied to the wire 47 will serve to operate the relay B. Upon such operation of the relay B, the energizing circuit is extended from the contact B—1U by wires 80, 81 and 70 in series to the line wire L—1, thereby to afford a locking circuit for the relay B until the main relay is released.

The circuits for the relay C are similar in character, and the other terminal of the relay C is connected by wires 85 and 86 in series to the contact C—1U. A wire 87 extends from the wire 86 to the contact B—2L, while the wire 46 extends from the contact B—2 to the brush 42. The contact C—1 is connected to the wire 81, and thus energizing and holding circuits for the relay C are provided which are similar to those afforded for the relay B. Since the period of closure of the energizing circuits of the relays B and C may be relatively short, condensers 92 and 93 of relatively small capacity are connected, respectively, across the terminals of the relays B and C so as to insure operation thereof even where the period of closure of the energizing circuits may be quite short.

As pointed out in the Wilson Patents Nos. 2,443,437 and 2,443,438, the length of the release period of the main relay A constitutes a measure of the minimum time interval that should elapse, when the speed differential is within the specified limits, between an impulse transmitted along the wire 45 and an impulse transmitted along the wire 46 or the wire 47, and when such time interval is less than the release period of the main relay A, this condition is indicative of the existence of an objectionable speed difference between the shafts 20M and 20—1. Therefore, the relay A preferably has its slow-to-release characteristics imparted thereto by a condenser 95 connected between the wire 62 and a wire 96 extended from the wire 45, thus to place the condenser 95 across the terminals of the relay A, and the effectiveness of the condenser 95 is adjustable by a rheostat 97 connected across the wires 62 and 96.

The manner in which the relays of the control unit CU—1 are energized is dependent on the relative positions of the secondary shaft and the master shaft as well as upon the sense and rate of any relative rotational movement which exists therebetween; and the selective operation of the relays A and B is indicative of the sense of relative rotation which exists between the master and secondary shafts, and is effective to cause operation of the speed control means in one direction, while the selective actuation of the relays A and C serves to govern the operation or adjustment of the speed control means in the opposite direction. Of the two relays B and C, the relay B is operated when the sense of relative rotation of the shafts indicates that the speed of the secondary shaft is to be increased, while the relay C is operated when the sense of relative rotation indicates that the speed of the secondary shaft is to be reduced. Therefore, the contact B—3U is connected to the terminal of the power relay P which will operate the speed adjusting means in such a direction as to increase the speed of the engine 22; and the circuit from the contact C—3U to the other terminal of the power relay P serves to cause the speed adjusting means to decrease the speed of the engine 22.

As an example of the operation of the structure thus far described, it will be assumed that both the master shaft 20M and the secondary shaft 20—1 are rotating in a clockwise direction, as indicated by the arrows in Fig. 1, and that the speed of the secondary shaft 20—1 is slightly greater than that of the master shaft so that the sense of rotation of the secondary shaft is clockwise relative to the master shaft. For descriptive purposes, therefore, the master shaft may be considered as being stationary, with the brush 40 in the position shown, while the secondary shaft 20—1 and the connected brushes are rotating in a clockwise direction. Under such circumstances, the rotation of the brush assembly of the secondary commutator switch will establish a circuit from line wire L—1 through the master brush 40, the wire 51 and the commutator bars connected thereby, the brush 41, the wire 45, the relay A, the wire 62, wire 63, contacts B—3L and B—3, the wire 64, relay contacts C—3L and C—3, and wires 65 and 58, the manual switch 57, and back to the line wire L—2. Thus, the main relay A is energized and the contact A—1 is engaged with contact A—1L. Such energization of the main relay A continues until the aforesaid circuit is broken, as by the brush 41 passing in a clockwise direction past and out of contact with the commutator bar connected to the wire 51, and during this period of energization, the condenser 95 is charged so as to maintain the relay A energized and the relay contacts A—1 and A—1L closed for the desired delay or release period. Thus, during such delay period, the continued closure of the contacts A—1 and A—1L conditions the common circuit to the relays B and C so that these relays may be selectively energized by the cooperative action of the commutator switches MS and S—1.

It may happen, of course, that the speed of relative rotation of the shafts 20M and 20—1 is so slow that the relay A will release or become ineffective and the relay contacts A—1 and A—1L will be opened prior to the closure of a circuit to one of the secondary relays B or C. Such operation indicates that relative speed of the two shafts is within the allowable tolerance. However, if the speed of relative rotation of the two shafts exceeds such tolerance, and if it is of such a sense that the secondary shaft 20—1 is rotating in a clockwise direction relative to the master shaft 20M, the brush 42 of the secondary commutator will move into contact with the commutator bar which is connected to the wire 51 and the brush 40 prior to the expiration of the release period of the master relay A, and hence the circuit to the secondary relay C will be energized. This establishes a circuit through the contacts C—3 and C—3U and the wire 71 to the power relay P, so as to operate the speed governing means 26 to reduce the speed of the engine 22.

As disclosed in the aforesaid Wilson Patents Nos. 2,443,437 and 2,443,438, the amount or extent of the corrective adjustment is varied and controlled in various ways so as to attain unusual accuracy of correlation and unusual stability and the minimum fluctuation in the speed relationship of the two shafts. Thus, as one factor in attaining such controlled extent of the corrective adjustment, it will be clear that the length of the unexpired portion of the delay period of the main relay A at the time when the secondary relay coil, as B, is energized, constitutes a variable quantity which is in a general way a measure of the amount of corrective adjustment which is needed to reestablish the desired speed relationship. It has been pointed out, however, in the preceding discussion that in attaining speed correlation within a relatively small tolerance, in the order of one revolution per minute, the mechanism must be able to detect extremely small speed differences, and this requires that the release period of the main relay A be quite extended in most instances. Thus, under many circumstances, the extended release period would tend to so extend the operative period of the speed adjusting means 26 as to cause over-correction of the speed of the secondary shaft. In the aforesaid Wilson Patents Nos. 2,443,437 and 2,443,438, means are provided which enable a release period of the desired length to be employed for the main relay A without danger of objectionable over-correction, and means of a similar character are utilized in the present apparatus for reducing the release time of the main relay A in each control operation of the speed adjusting means 26. Thus, a normally long release period in the order of three or four seconds may be employed for the main relay A, thereby to enable extremely small speed differences to be detected, and yet, this may be accomplished without causing an undue amount of corrective adjustment to be applied to the secondary shaft.

Thus, in the control unit CU—1, the normal release time of the master relay A may be made relatively long, thereby to attain high sensitivity to small differences of speed, and means are provided for reducing this normal release time of the master relay A in the course of a control operation. In attaining this end, the wire 62 has a branch lead 101 extended therefrom to one end of a resistor 103. An adjustable contact 104, associated with the resistor 103, is connected to the contact B—4, while a wire 105 extends from the contact B—4U to the wire 96. Similarly, a variable resistor 106 has one end thereof connected by a wire 107 to the wire 96, and an adjustable contact 108 is connected to the contact C—4, the related contact C—4U being connected by a wire 109 to the wire 62. Thus, the resistors 103 and 106 may be selectively connected across the terminals of the relay A, as will now be described.

In the apparatus disclosed in the aforesaid Wilson Patents Nos. 2,443,437 and 2,443,438, the resistance corresponding to the resistances 103 and 106 was connected across the main relay, as A, immediately upon closure of the correcting circuit to the speed adjusting means, or in other words, upon operation of the relay B or the relay C, and because of this the release period of the main relay was reduced in the course of each correcting operation so as to require a succession of intermittent correcting operations where a large speed differential was encountered. Under the present invention, however, as embodied in the structure shown in Fig. 1, the successive periods of operation of the relays B and C are utilized only when the speed differential is relatively small, thereby as to retain their effectiveness of the resistances 103 and 106 in preventing over-correction where small speed differences are detected, and means are afforded which are effective when a relatively great speed differential is detected to cause continuance of the corrective operation of the speed adjusting means until the speed differential has been reduced to a relatively small minimum value, and thus, under the present invention, the total time required to correct large speed differences is materially reduced.

In accomplishing the foregoing, use is made of the power relay P, which serves in turn to govern the speed adjusting apparatus 26. Thus, the relay P has a movable contact 110 that is movable from a normal position in opposite directions selectively into engagement with a stationary contact 112—I or a stationary contact 112—D. The movable contact 110 is connected by a wire 113 to the wire 58, which is connected to a stationary contact 114—S of the manual switch 57. The movable contact 115 of the switch 57 is connected to the line wire L—2. The switch 57 has additional stationary contacts 114—I and 114—D which may be selectively engaged by the movable contact 115, and wires 116—I and 116—D are extended from these contacts to the stationary contacts 112—I and 112—D of the power relay P. Branch leads 117—I and 117—D are extended, respectively, from the wires 116—I and 116—D to the direction determining windings 118—I and 118—D of the speed adjusting unit 26, the common terminal of these windings being connected to the line wire L—1. Limit switches 119—I and 119—D are included in the wires 117—I and 117—D, and these switches are arranged, when the limit of adjustment has been reached, to connect the wire 117—I or the wire 117—D to a wire 120 which extends to one terminal of a signal lamp 121, the other terminal of which is connected by a wire 122 to the line wire L—1.

With the foregoing arrangement, the speed adjusting unit 26 may be operated selectively in one direction or the other by engagement of the contact 115 selectively with the contacts 114—I or 114—D, or when the contact 115 is engaged with the contact 114—S, similar operation may be attained by operation of the power relay P to engage the contact 110 selectively with the contacts 112—I and 112—D. Thus the relay P has the usual or main operating coils 125—I and 125—D for actuating the contact 110, respectively, into engagement with the contacts 112—I and 112—D, and one terminal of each of these coils is connected to the line wire L—1 by the wire 69. The other terminal of the coil 125—I is connected to the wire 68, while the other terminal of the coil 125—D is connected to the wire 71.

Under and in accordance with the present invention, means are afforded for holding the contact 110 in either one of its operated positions after the operating coil 125—I or 125—D which cause such operation has been deenergized, and such means are rendered responsive to the relative speed of the shafts 20M and 20—1 so that continuous operation of the speed adjusting means will be attained until the speed variance has been reduced to a very small value. As herein shown, such means are afforded by secondary operating or holding coils 127—I and 127—D, that are arranged to act on the contact 115 in the same direction as the respective main operating coils 125—I and 125—D, but with substantially less force. Thus, the secondary or holding coils 127—I and 127—D are so formed that when energized they have insufficient power to operate or move the contact 110 to an operated position; sufficient power to hold the contact 110 in an operated position after it has been so operated by one of the main coils 125—I or 125—D; and insufficient power to hold the contact 110 in one of its operated positions against the actuating force that is effective when the opposing main coil 125—I or 125—D is energized.

Since the secondary coils 127—I and 127—D thus accomplish merely a holding or retaining function, these coils may be concurrently energized when the holding function is to be accomplished, and this is done by means including a relay F. This relay has a normally open movable contact F—1 that its connected by wires 131 and 133, in series, to the wire 65, thus to be connected to the line wire L—2 through the contact 114—S of the manual switch 57. The coils 127—I and 127—D each have one terminal connected to the wire 68 which in turn is connected by the wire 70 to the line wire L—1. The other terminals of the coils 127—I and 127—D are connected, respectively, with stationary contact F—1L of the relay F by wires 134 and 135 and wire 132, so that when the relay F is operated, energizing circuits for the two secondary or holding coils will be closed.

Energizing means are afforded for the relay F so that so long as the detected speed differential exceeds a predetermined minimum, the relay F will be energized in each detecting cycle of the mechanism, and this is accomplished in such a way that so long as the speed differential exceeds such predetermined minimum, the relay F will remain energized during the periods that would ordinarily constitute idle periods of the adjusting means 26, thereby to cause continuous operation of the speed adjusting means 26 until the speed differential has been reduced to substantial synchronism. For this purpose, an energizing condenser 140 has one terminal thereof connected by a wire 141 to the wire 72, which is, of course, connected through wire 58 and the manual switch 57 to the line wire L—2. The other terminal of the condenser 140 is connected by a wire 142 to the relay contact A'1, and the relay contact A'1U is connected by a wire 143 to the wire 81, which is, of course, connected through the wire 70 to the line wire L—1. Thus, the condenser 140 is charged during the time when the relay A' is in its released condition. The condenser 140 has a variable resistance 145 connected thereacross so that the rate of dissipation of the energy from the condenser 140 may be adjustably controlled.

When the relay A' is operated, the contact A'1 is moved downwardly into engagement with the lower contact A'1L, and this contact is connected by a wire 146 to one terminal of the relay F, the other terminal being connected by a wire 147 to the wire 130. Hence, when the relay A' is operated, the condenser 140 is connected across the relay F so that the charge on the condenser 140 is effective to operate the relay F, the circuit being from the condenser 140 through the wire 141, the wire 72, the wire 130, the windings of the relay F, the wire 146, the contact A'1L and A'1, and the wire 142 back to the condenser 140. In this connection it should be noted that the relay F has a condenser 150 and an adjustable resistance 151 connected in parallel across the terminals of the relay, and the condenser 150 and the variable resistance 151 serve to impart slow-to-release characteristics to the relay F, the condenser 150 being charged by the condenser 140 when the relay A' is actuated as aforementioned.

One side of the winding of the relay A' is connected to one end of a wire 143, the other end of which is connected through the wires 81 and 70 to the line wire L—1. The other side of the winding of the relay A' is connected through a wire 73' and the wire 73 to the contact A—1L of the relay A, the movable contact A—1 of the relay A, of course, being connected through the wires 72 and 58, and the switch 57 to the other line wire L—2. Thus, it will be seen that operation of the relay A' is controlled by the relay A, operation of the latter relay being effective to close the contacts A—1 and A—1L to thereby close the circuit through the relay A' between the line wires L—1 and L—2, and release of the relay A being effective to move the contact A—1 away from the contact A—1L to thereby open the last mentioned circuit.

It will be remembered that when the relay A' is released, the condenser 140 is connected across the line wires L—1 and L—2 and in a charging circuit, and when the relay A' is operated, the condenser 140 will be connected across the terminals of the relay F and the condenser 150, in a discharging circuit. This latter condition, of course, not only causes the relay F to be operated, but serves to charge the condenser 150 in an amount that is related to the initial charge on the condenser 140 and which is governed by the ratio between the capacities of the condensers 140 and 150.

It also will be remembered that whenever one or the other of the secondary coils B or C is operated to effect operation of the power relay P, the relay A is in operated condition. At such time, of course, the relay A being energized, the relay A' is also energized so that the condenser 140 is connected across the relay F and the condenser 150, as previously mentioned. Subsequently, when the release time of the relay A expires so as to cause release of the relay A, as well as the secondary relay B or C, the relay A' is also released to thereby disengage the contact A'1 from the contact A'—IL and thereby open the circuit between the condenser 140 and the relay F so that the condenser 150 is left connected across the relay F. It will be seen that, if the charge remaining on the condenser 150 at that time is insufficient to energize the relay F, the contacts F—1 and F—IL will be engaged to thereby close the previously mentioned circuits through the proper secondary coil 127—I or 127—D and hold the contact 119 in engagement with the proper contact 112—I or 112—D, respectively, to thereby prolong operation of the speed adjusting means 26. However, it will be seen that when the charge in the condenser 150 drops below a predetermined value, it becomes ineffective to maintain the relay F energized, and, therefore, it will be seen that if the speed differential is less than a predetermined minimum so that the condenser 140 is not effective to charge the condenser 150 frequently enough to energize the condenser 150 to a level sufficiently high to effect operation of the relay F, or, if during energization of the relay F by the condenser 150, the charge in the condenser 150 drops below the predetermined minimum value so that it is no longer capable of operating the relay F, the contacts F—1 and F—IL are opened and the circuits to the secondary coils 127—I and 127—D of the power relay P are opened so that the holding circuits for the speed changing means 26 are deenergized.

Thus, it will be seen that when the speed differential is above the aforementioned minimum, the condenser 150 is rendered effective to actuate the relay F to thereby prolong the control operation of the power relay P and thereby effect substantially continuous actuation of the speed changing means, whereas, when the speed differential is less than the aforesaid minimum the condenser 150 is rendered ineffective to actuate the relay F and the control operation of the power relay P is, therefore, shortened, so as to afford short, quick actuation of the speed changing means with subsequent sensitive adjustment of the speed adjusting means.

The period through which the condenser 150 may be effective to hold the relay F in its operative condition may be adjusted by adjustment of the variable resistances 145 and 151. Under some conditions, of course, one or both of these resistances may be made of a fixed value, although I prefer to provide adjustment in at least one of these resistances so as to facilitate installation and maintenance of the apparatus.

Figures 2, 3:
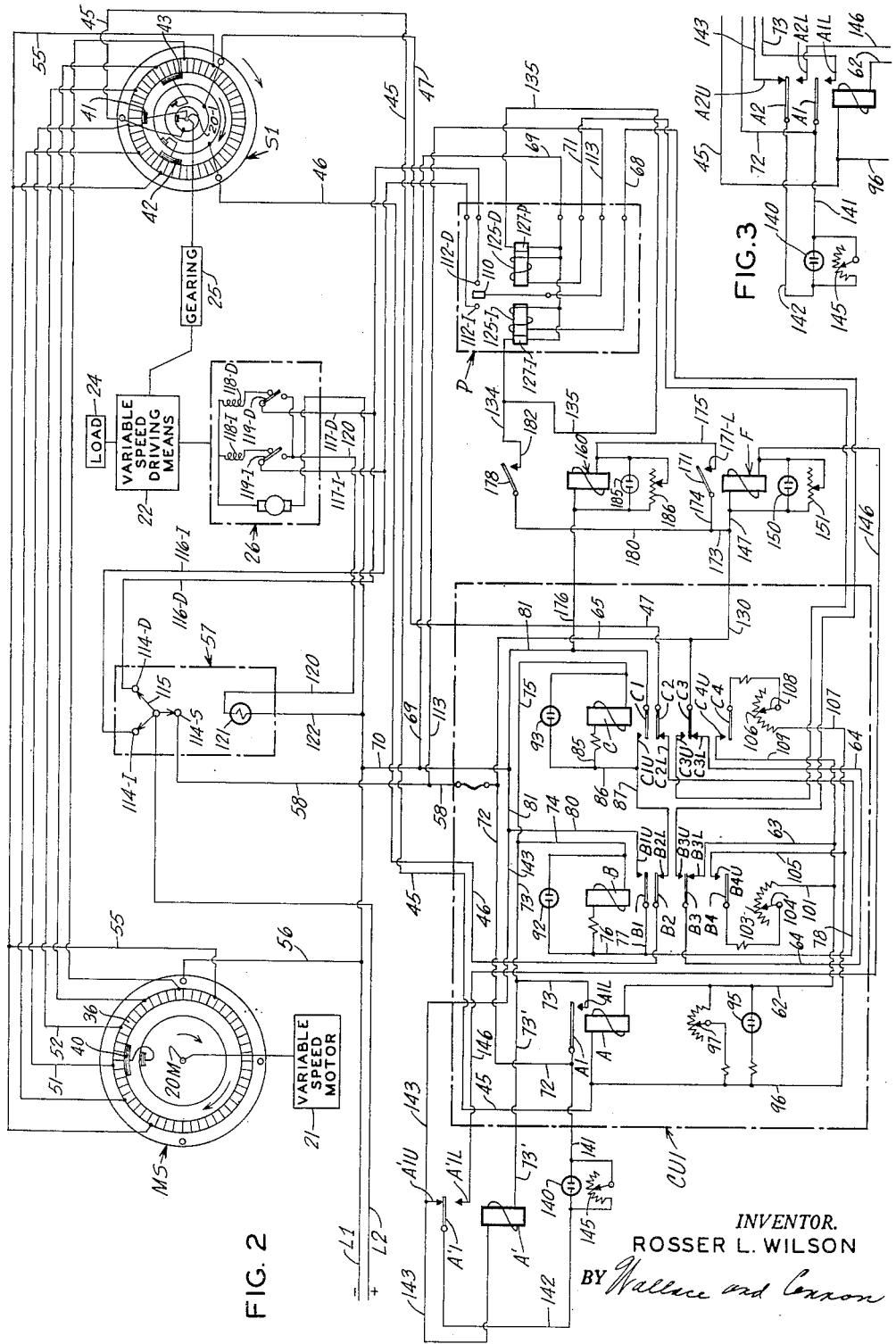
Fig. 2 is a similar view illustrating an alternative embodiment of the invention.
Fig. 3 is a view similar to Figs. 1 and 2, showing another alternative form of my invention.

In Fig. 2 of the drawings, an alternative embodiment of the invention is disclosed, and in this alternative embodiment of the invention many of the structural elements and relationships are the same. Hence, in respect to those elements of structure which are identical with the elements shown in Fig. 1, the same reference characters have been utilized. The primary difference between the structures shown in Figs. 1 and 2 is the provision of a second power relay 160 that is under control of the relay F, thereby to enable the power relay P to be controlled by the relay F through the intermediate agency of power relay 160. Thus, the relay F in Fig. 2 is connected and energized in the manner hereinbefore described, and this relay has a single movable relay contact 171 that is adapted when relay F is energized to be engaged with a stationary contact 171L. The contact 171 is connected by wires 173 and 174 to the wire 130, and a wire 175 from contact 171L extends to one terminal of the coil of the power relay 160, the other terminal of this coil being connected by the wire 176 to the wire 81. Thus, when the relay F is energized in the manner hereinbefore explained in connection with the embodiment of the invention shown in Fig. 1, an energizing circuit is extended to the power relay 160. This relay has a contact 178 connected by a wire 180 to the wire 173, in substantially the same manner as the contact F—1 hereinbefore described in connection with Fig. 1. Contact 178 is arranged to engage a stationary contact 182 which is connected to the wires 134 and 135. It will thus be seen that the action of the structure shown in Fig. 2 is, in the main, quite similar to the action of the structure shown in Fig. 1 with the exception, however, that the provision of the separate power relay 160 enables more accurate control of the functioning of the apparatus. Thus, the relay 160 has a condenser 185 and an adjustable resistance 186 connected across the terminals of the operating coil, thereby to impart slow-to-release characteristics to the power relay 160. With the power relay 160 having slow-to-release characteristics, the adjustment of the circuit is materially simplified and the desired operating characteristics may be more easily attained.

In Fig. 3 of the drawings, another alternative form of my invention is illustrated wherein the relay A', shown in Figs. 1 and 2, may be eliminated, and control of the operation of the condenser 140 may be effected through the operation of the relay A. In this modified or alternative embodiment of my invention, many of the structural elements and relationships are the same, and, hence, in respect to those elements of structure which are identical with the elements shown in Figs. 1 and 2, the same reference characters have been utilized, with only those structural elements shown that are necessary to clearly illustrate how the various parts shown in Fig. 3 may be embodied in the forms of my invention shown in Figs. 1 and 2.

The primary difference between the structure shown in Fig. 3 and the structure shown in Figs. 1 and 2 is the elimination of the relay A' and the provision of a second group of contacts for the relay A, namely, a movable contact A—2 and two stationary contacts A—2L and A—2U engageable therewith, thereby to enable the relay A to substantially directly control the charging and discharging of the condensers 140 and 150 and, therefore, operation of the relay F, without the intermediacy of another relay such as the relay A'. The structure shown in Fig. 3 may be used in the structure shown in either Fig. 1 or Fig. 2 by eliminating the relay A' and providing a relay A having the two sets of contacts A—1 and A—1L, and A—2, A—2L and A—2U, respectively.

In the form of the invention shown in Fig. 3, one terminal of the condenser 140 may be connected by the wire 141 to the line 72 which is, of course, connected to the power line L—2, as previously mentioned with respect to the embodiments of my invention shown in Figs. 1 and 2; and the other terminal of the condenser 140 may be connected by the wire 142 to the movable contact A—2 of the relay A. The upper stationary contact A—2U is connected to the wire 143 so that it may be connected to the power line L—1 and one terminal of the relay F in substantially the same manner as that in which the contact A'IU is connected thereto, as shown in Figs. 1 and 2; and the lower stationary contact A'—IL is connected to the wire 146 so that it may be connected to the other terminal of the relay F in substantially the same manner as that in which the contact A'1L is connected thereto, as shown in Figs. 1 and 2.

Thus, it will be seen that, as in the embodiments of my invention, shown in Figs. 1 and 2, when the relay A is not energized, the condenser 140 is connected across the line wires L—1 and L—2 to be charged thereby, the movable contact A—2 being engaged with contact A—2U; and the condenser 150 is the only power source connected across the winding terminals of the relay F at that time because the contact A—2 is out of engagement with the contact A—2L so that the circuit between the condenser 140 and the relay F is open. Likewise, it will be seen that, as in the embodiments shown in Figs. 1 and 2, when the relay A is energized, the charging circuit for the condenser 140 is opened, the contact A—2 being disengaged from the contact A—2U; and the condenser 140 is connected across the relay F and the condenser 150, the contact A—2 being engaged with the contact A—2L.

Therefore, it will be seen that, if desired, a single relay A having a plurality of sets of contacts may be used as shown in Fig. 3, rather than using two relays, such as the relays A and A', each having a single set of contacts, as shown in Figs. 1 and 2, although, for practical reasons of adjustment and the like, in most instances, I prefer to use the two relays A and A', as previously mentioned.

Figure 4:
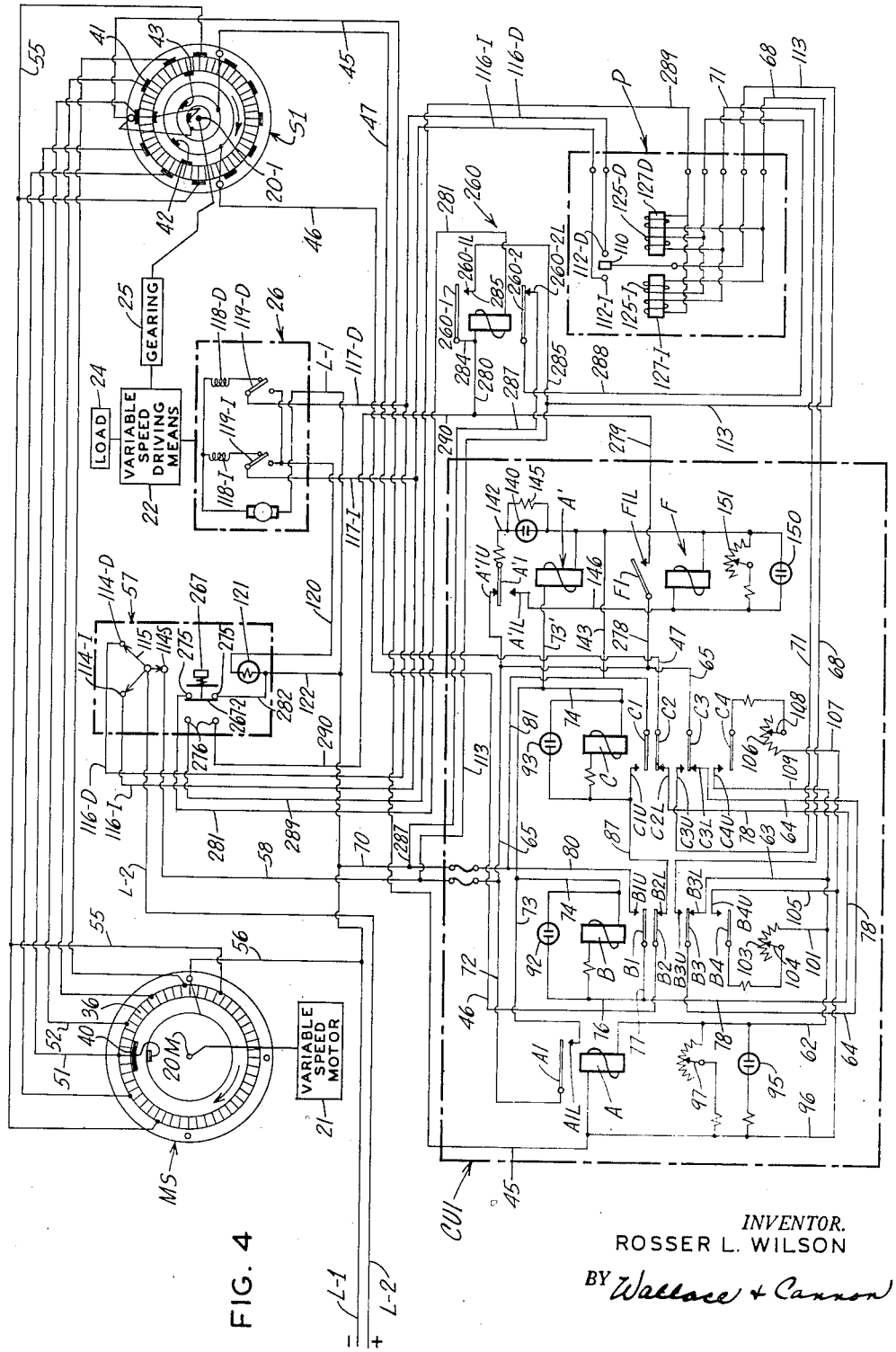
Fig. 4 is a view similar to Figs. 1 and 2 and illustrating another form of my invention.

In Fig. 4 of the drawings, another alternative embodiment of the invention is disclosed, and in this alternative embodiment many of the structural elements and relationships are the same as in the previously described embodiments. Therefore, in respect to those elements of structure which are identical with the elements shown in Fig. 1, the same reference characters have been utilized. The primary difference between the structures shown in Figs. 1 and 4 is represented by a change in the controlling function of the relay F which, as hereinabove described, is effective to detect speed variances in excess of a predetermined range. Thus, in the embodiment of the invention shown in Fig. 4, the relay F is operated in the same way as hereinbefore described in connection with Fig. 1, but in the embodiment of Fig. 4, this relay F is effective to cause energization of a cutout relay 260 which breaks the energizing circuit to the power relay P so as to thereby prevent further automatic operation of the control apparatus. As will be hereinafter described, the control relay 260 includes a holding circuit so that in order to again render the control apparatus automatically operative, it is necessary to deenergize the relay 260, and this is accomplished under control of the relay F after the speed differential has been brought within such predetermined range by operation of a manual control switch 267 that is included in the present instance in the manual control panel 57. The manual control switch 267 is effective, as will hereinafter be described, to close operating circuits to the power relay P in such a manner that the operator may, by operation of the manual switch 267, cause continuous operation of the adjusting means 26 in the direction determined by the control apparatus so as to thereby bring the speed differential to some point within the allowable range of variation, after which the relay F becomes deenergized so that the holding coils 127I and 127D become ineffective, thereby to condition the control apparatus for resumption of its automatic controlling operation which will, of course, bring the secondary shaft 20—1 into synchronism with the master shaft 20M.

It should be pointed out that in the embodiment of the invention shown in Fig. 4, the control apparatus operates within a predetermined range of speed variation to adjust and correct such speed variation in the precise manner that is disclosed in the aforesaid Wilson Patent No. 2,443,437, but when the speed variance exceeds such predetermined range, the relay F detects such excessive speed variance and renders the control apparatus inoperative. Under such circumstances, the operator may then actuate the manual control switch 267 so as to cause continuous operation of the speed adjusting unit 26 in the direction that is determined by the operation of the relays A, B and C, and thus the objectionable speed variation may be corrected and the shafts may be brought within said predetermined range so that the control apparatus may resume its automatic operation so as to bring the shafts into synchronism.

It will be recalled that in the embodiment of the invention shown in Fig. 1, the power relay P is controlled in part by the relay F in that when the relay F is operated, the holding coils 127I and 127D of the power relay are energized. In the embodiment of the invention shown in Fig. 4, however, the holding coils 127I and 127D are not normally under control of the relay F, but in contrast, are under control of the relay F only when the manual control switch 267 is actuated. Thus, as shown in Fig. 4, the manual control switch 267 has a movable switch bar 267—2, and when the switch 267 is in its released or normal position, the switch bar 267—2 engages a pair of stationary contacts 275 so as to bridge these two contacts. The switch 267 also has a pair of contacts 276, and when the switch 267 is actuated, the switch bar 267—2 is moved out of engagement with the contacts 275 and into engagement with the contacts 276 so as to bridge the two contacts 276. After the switch bar 267—2 has moved out of engagement with the contacts 275, it is moved into engagement with the contacts 276, and the operation that results from such actuation of the switch 267 will be hereinafter described.

The controlling connections from the relay contact F—1 are afforded so that upon operation of the relay F, the control relay 260 will be energized. Thus, circuit is extended from the line wire L—2 through the switch contact 114S and the wires 58 and 65 to a wire 278 that is extended to the contact F—1, and a wire 279 and a wire 280 are extended in series from the contact F—1L to one terminal of the relay 260, this relay having a wire 281 extended from its other terminal to one of the contacts 275, and the other contact 275 being connected by a wire 282 to the wire 122 so as to extend the circuit back to the line wire L—1; hence, upon closure of the contact F—1, the relay 260 is energized.

The relay 260 has a pair of movable contacts 260—1 and 260—2, and the relay contact 260—1 is normally spaced from a stationary contact 260—1L. The relay contact 260—2 is normally engaged with a contact 260—2L. The relay contact 260—1 is utilized to afford a holding circuit for the relay 260, and for this purpose the contact 260—1 is connected by a wire 284 to the wire 280. The contact 260—1L is connected by a wire 285 to the wire 113 that is, of course, extended to the wire 58 so as to afford the desired holding circuit for the relay 260. This holding circuit, of course, includes the contacts 275 so that the control relay 260 may be deenergized or released by closure of the manual control switch 267.

The normally closed relay contact 260—2 is utilized to disable the power relay P during the time when the control relay 260 is thus energized, and for this reason the relay contact 260—2 is included in the common power lead to the operating coils 125I and 125D of the power relay. Hence, in this respect, the connections for the power relay P differ from the connections utilized in the embodiment of the invention shown in Fig. 1. Thus, the stationary contact 260—2L is connected by a wire 287 to the wire 70, thereby to afford a connection to the line wire L—1. The movable contact 260—2 is connected by a wire 288 to the common terminals of the relay coils 125I and 125D, this connection through the relay contact 260—2 replacing the constantly closed connection that is afforded in the embodiment of Fig. 1 by the wire 69.

With the structure that is described, it will be evident that upon operation of the relay 260, the circuit to the relay operating coils 125I and 125D will be broken so that no matter what operation may be obtained in the relay panel that includes the relay A, B and C, the power relay P will be inoperative and the main contact 110 will remain in its center position. In this connection it will be observed that the holding coils 127I and 127D are not effective so that the breaking of the circuit to the main coils 125I and 125D by the relay contact 260—2 is effective, in the event that the relay P is at this time in its operated condition, to cause release of the relay P for movement to its neutral or ineffective position.

The control relay 260, of course, will remain in its operative condition due to the holding circuit afforded by the relay contact 260—1, and under these circumstances, the operator may desire to correct the undesired speed variance that has caused such operation of the relay 260. This is done by actuating the manual switch 267 which, by breaking circuit between the contacts 275 thereof, serves to deenergize or release the control relay 260. This, of course, causes the relay contact 260—2 to return to its normal position so that the operating coils 125I and 125D may be selectively energized under control of the relays A, B and C, and by closure of circuit between the contacts 276 of the manual switch 267, a circuit is completed for the holding coils 127I and 127D. It should be observed in this respect that one terminal of each of these two holding coils is connected in exactly the same manner as in the embodiment of the invention shown in Fig. 1. Thus, one terminal of the holding coil 127D is connected to the wire 68, while one terminal of the holding coil 127I is connected to the wire 71. The common contacts of the holding coils 127I and 127D are connected by a wire 289 to one of the contacts 276, the other of these two contacts being connected by a wire 290 to the wire 279. When one of the secondary relays B or C is operated in the normal operation of the control panel, the other side of the circuit for the aforesaid holding coils is completed to the line wire L—2 through the switch arm 115. This may be illustrated with respect to the holding coil 127D by noting that the other terminal of this holding coil is connected to the wire 68, which extends to the relay contact B—3U, and when the relay B is energized in the course of a controlling operation, the circuit is extended through the contact B—3, the wire 64, the contact C—3L, the contact C—3, the wires 65 and 58 in series, the contact 114S, the switch arm 115, and to the line wire L—2. A similar operation is afforded in respect to the other one of the holding coils.

The operator may thus, by operation or closure of the switch 267, render the relay panel again operative to control the power relay P, and may at the same time render the holding coils 127I and 127D effective so that continuous operation of the adjusting unit 26 may be attained in the proper direction so long as the relay F remains operated and the manual control switch 267 is maintained in its operated position. When the speed relationship of the two shafts has been brought within the predetermined range, the relay F becomes deenergized so that the holding coils 127I and 127D become ineffective, and hence the relay panel will again resume its normal automatic operation so as to bring the shafts into synchronism. This takes place whether or not the switch 267 is released.

From the foregoing description it will be apparent that the control apparatus of the present invention is effective to produce constant readjustment of speed as long as the speed differential exceeds a predetermined amount, and after the readjustment has progressed to a point where the differential is less than such a predetermined minimum, the control apparatus continues to function in a series of short adjusting periods until the desired speed relationship has been reestablished. In this connection, it will be observed that the control apparatus of the present invention assures against objectionable overcorrection through the relationship that is embodied in the power relay P. Thus, if the correcting operation proceeds so rapidly as to pass through a condition of synchronism, this will immediately be detected, and by operation of the opposite relay coil 125I or 125D of the power relay, the direction of operation of the speed adjusting means 26 will immediately be reversed. Under such circumstances, of course, the relative speed of the two shafts will be below the predetermined minimum that governs the operation of the relay F, and hence the relay F will become deenergized at about this time and the readjusting operation will proceed in the normal manner wherein proportionalized control periods will be utilized to bring the shafts into synchronism.

In view of the foregoing, it will be apparent that the present invention materially reduces the time required for reestablishing synchronism or any desired speed relationships between a pair of shafts or the like, and it will also be evident that while the present invention has been illustrated and described as applied to the synchronization of but two shafts, this relationship may, of course, be extended so as to synchronize a large number of independently driven shafts.

Thus, while I have illustrated and described the preferred embodiments of my invention, it is to be understood that they are capable of variation and modification, and I therefore do not wish to be limited to the precise details set forth, but desire to avail myself of such changes and alterations as fall within the purview of the following claims.

I claim:

1. In a control apparatus for correlating the speed of an independently driven secondary shaft with the speed of a master shaft to attain substantially a predetermined speed relationship therebetween, detecting means operable to compare the speeds of said shafts, adjusting means operable selectively to adjust the speed of said secondary shaft in either direction to establish such predetermined relation, a primary governing means normally operable under control of said detecting means to operate said adjusting means in the proper direction to reduce any detected speed variance by a succession of spaced adjusting periods that vary in length in accordance with the magnitude of such detected speed variance, and a second governing means operable under control of said detecting means and effective after a speed adjusting operation has been started and while the detected speed variance exceeds a predetermined minimum to maintain said speed adjusting means in continuous operation.

2. In a control apparatus for correlating the speed of an independently driven secondary shaft with the speed of a master shaft to attain substantially a predetermined speed relationship therebetween, detecting means operable to compare the speeds of said shafts, to determine the relative speed and sense of any speed variance from said predetermined speed relationship, speed adjusting means operable selectively in one direction or the other to apply corrective speed adjustments to said secondary shaft, governing means operable normally under control of said detecting means to operate said speed adjusting means in a series of intermittent operating periods to correlate the speed of said secondary shaft with the speed of said master shaft, and means responsive to the magnitude of the detected speed difference to sustain continuous operation of said speed adjusting means while and until the speed difference has reached a predetermined minimum.

3. In a control apparatus for correlating the speed of an independently driven secondary shaft with the speed of a master shaft to attain substantially a predetermined speed relationship therebetween, detecting means operable to compare the speeds of said shafts, adjusting means operable selectively to adjust the speed of said secondary shaft in either direction as required to establish such predetermined relation, a primary governing means normally operable under control of said detecting means to operate said adjusting means in the proper direction to reduce any detected speed variance by a succession of spaced adjusting periods that vary in length in accordance with and in substantially direct proportion to the magnitude of such detected speed variance, and a second governing means operable under joint control of said detecting means and said primary governing means and effective after a speed adjusting operation has been started and while the detected speed variance exceeds a predetermined minimum to maintain said speed adjusting means in continuous operation.

4. In a control apparatus for correlating the speeds of a master shaft and an independently driven secondary shaft to attain substantially a predetermined speed relationship therebetween, detecting means associated with said shafts to compare the speeds of said master and secondary shafts and including a master device effective when operated to retain its operated condition for a normal predetermined period, and two secondary devices, said devices being arranged for sequential operation at a frequency determined by the magnitude of the variance from said predetermined speed relationship and in different sequence according to the sense of such variance, adjusting means operable in opposite directions to variably adjust the operating speed of said secondary shaft, means controlled by said detecting means and effective to operate said adjusting means in one direction for increasing the speed of said secondary shaft when one of said secondary devices is operated while said master device is in its operated condition, other means controlled by said detecting means and effective to operate said adjusting means in the opposite direction for decreasing the speed of said secondary shaft when the second of said secondary devices is operated while said master device is in its operated condition, and means governed by said master device and operable when said adjusting means are operated in response to a relatively large speed differential to maintain such speed adjusting means in continuous operation until the speed differential between said shafts reaches a predetermined minimum.

5. In a control apparatus for correlating the rotative speeds of relatively rotatable elements such as independently driven shafts to maintain a predetermined speed relationship therebetween, the combination of a master shaft and variable speed driving means therefor, a secondary shaft having a variable speed engine for driving the same, switch means including relatively rotatable parts associated with the respective shafts, circuit means electrically interconnecting said switch means and affording a main control circuit and two secondary control circuits so associated with said switches that variation from said predetermined relationship between the speeds of said shafts produces electrical impulses successively in said control circuits at a frequency indicative of the magnitude of such variance and in a sequence indicative of the sense of such variance, speed adjusting means for selectively adjusting the speed of said engine in two directions to correct such speed variance, control means responsive to the sequence and frequency of said electrical impulses to cause operation of said adjusting means in the proper direction to reduce the variance from the desired speed relationship of said shafts, and means responsive to the frequency of the electrical impulses in said main control circuit to maintain said speed adjusting means in continuous operation while the detected speed variance exceeds a predetermined minimum.

6. In a control apparatus for correlating the rotative speeds of relatively rotatable elements such as independently driven shafts to maintain a predetermined speed relationship therebetween, the combination of a master shaft and variable speed driving means therefor, a secondary shaft having a variable speed engine for driving the same, switch means including relatively rotatable parts associated with the respective shafts, circuit means electrically interconnecting said switch means and affording at least three control circuits so associated with said switches that variation from said predetermined speed relationship produces electrical impulses successively in said control circuits at a frequency indicative of the magnitude of such variance and in a sequence indicative of the sense of such variance, speed adjusting means for selectively adjusting the speed of said engine in opposite directions to correct such speed variance, control means responsive to the sequence and frequency of said electrical impulses to cause operation of said adjusting means in the proper direction to reduce the variance from the desired speed relationship of said shafts, said control means including a governing element having a time delay period the length of which normally governs the length of the adjusting periods of said adjusting means and which also governs the sensitivity of the control means to low frequency of said impulses, means operable, when rendered effective, to reduce the length of the time delay period of said governing element, means governed by said governing element to render said last mentioned means effective, and means operable under control of said governing element while the detected speed variance exceeds a predetermined minimum to maintain said speed adjusting means in continuous operation.

7. In a control apparatus for correlating the rotative speeds of relatively rotatable elements such as independently driven shafts to maintain a predetermined speed relationship therebetween, the combination of a master shaft and variable speed driving means therefor, a secondary shaft having a variable speed engine for driving the same, switch means including relatively rotatable parts associated with the respective shafts, circuit means electrically interconnecting said switch means and affording at least three control circuits so associated with said switches that variation from said predetermined relationship between the speeds of said shafts produces electrical impulses successively in said control circuits at a frequency indicative of the magnitude of such variance and in a sequency indicative of the sense of such variance, speed adjusting means for selectively adjusting the speed of said engine in two directions to correct such speed variance, control means responsive to the sequence and frequency of said electrical impulses to cause operation of said adjusting means in the proper direction to reduce the variance from the desired speed relationship of said shafts, and means including a slow-to-release relay operable under control of one of said control circuits while the detected speed variance exceeds a predetermined minimum to maintain said speed adjusting means in continuous operation.

8. In a control apparatus for correlating the speeds of a master shaft and an independently driven secondary shaft to attain substantially a predetermined speed relationship therebetween, detecting means associated with said shafts to compare the speeds of said master and secondary shafts and including a master device effective when operated to retain its operated condition for a normal predetermined period and two secondary devices, said devices being arranged for sequential operation at a frequency determined by the magnitude of the variance from said predetermined speed relationship and in different sequence according to the sense of such variance, adjusting means operable in opposite directions to variably adjust the operating speed of said secondary shaft, power control means controlled by said detecting means and effective to operate said adjusting means in one direction for increasing the speed of said secondary shaft when one of said secondary devices is operated while said master device is in its operated condition, other power control means controlled by said detecting means and effective to operate said adjusting means in the opposite direction for decreasing the speed of said secondary shaft when the second of said secondary devices is operated while said master device is in its operated condition, electrically operable holding means operable to hold said power control means in operated condition, a slow-to-release control relay effective when operated to energize said holding means, and energizing means for said control relay governed by said master device and operable to energize said control relay each time said master device is operated.

9. In a control apparatus for correlating the speeds of a master shaft and an independently driven secondary shaft to attain substantially a predetermined speed relationship therebetween, detecting means associated with said shafts to compare the speeds of said master and secondary shafts and including a master device effective when operated to retain its operated condition for a normal predetermined period and two secondary devices, said devices being arranged for sequential operation at a frequency determined by the magnitude of the variance from said predetermined speed relationship and in different sequence according to the sense of such variance, adjusting means operable in opposite directions to variably adjust the operating speed of said secondary shaft, power control means controlled by said detecting means and effective to operate said adjusting means in one direction for increasing the speed of said secondary shaft when one of said secondary devices is operated while said master device is in its operated condition, other power control means controlled by said detecting means and effective to operate said adjusting means in the opposite direction for decreasing the speed of said secondary shaft when the second of said secondary devices is operated while said master device is in its operated condition, electrically operable holding means operable to hold said power control means in operated condition, a slow-to-release control relay effective when operated to energize said holding means, energizing condenser for said control relay, and switch means governed by said master device and operable in each cycle of operation of said master device to connect said condenser to a charging source and then to disconnect said source and connect said condenser to said governing relay.

10. In a control apparatus, a master relay having slow-to-release characteristics affording a normal release period of substantially predetermined length, a pair of secondary relays, a first control circuit having switch means therein arranged for closure when a first one of said secondary relays is rendered operative during such a release period of said master relay, means affording a holding circuit for said one of said secondary relays rendered effective by said one of said secondary relays when said one of said secondary relays is operated and governed by said master relay to release said one of said secondary relays when said master relay releases, a second control circuit having switch means therein arranged for closure when the other one of said secondary relays is rendered operative during such a release period of said master relay, means affording a holding circuit for said other one of said secondary relays rendered effective by said other one of said secondary relays when said other one of said secondary relays is operated and governed by said master relay to release said other one of said secondary relays when said master relay releases, means rendered operative selectively by said secondary relays when one of said secondary relays is operated for reducing the release period of said master relay, a power relay having a pair of main operating coils connected respectively in said first and second control circuits and also having a normally open movable contact and a pair of stationary control contacts into engagement with which said normally open contact may be moved by selective energization of said main operating coils, separate holding coils for said power relay operable when energized to hold said movable contact in a closed position to which it has been moved by one of said operating coils, a slow-to-release control relay, energizing circuits for said holding coils arranged to be closed by operation of said control relay, and energizing means for said control relay including a condenser, and means operable by said master relay to charge said condenser when said master relay is released and to connect said condenser across said control relay when said master relay is operated.

11. In a control apparatus, a master relay having slow-to-release characteristics affording a normal release period of substantially predetermined length, a pair of secondary relays, a first control circuit having switch means therein arranged for closure when a first one of said secondary relays is rendered operative during such a release period of said master relay, means affording a holding circuit for said one of said secondary relays when said one of said secondary relays is operated and governed by said master relay to release said one of said secondary relays when said master relay releases, a second control circuit having switch means therein arranged for closure when the other one of said secondary relays is rendered operative during such a release period of said master relay, means affording a holding circuit for said other one of said secondary relays rendered effective by said other one of said secondary relays when said other one of said secondary relays is operated and governed by said master relay to release said other one of said secondary relays when said master relay releases, means rendered operative selectively by said secondary relays when one of said secondary relays is operated for reducing the release period of said master relay, a power relay having a pair of main operating coils connected respectively in said first and second control circuits and also having a normally open movable contact and a pair of stationary control contacts into engagement with which said normally open contact may be moved by selective energization of said main operating coils, separate holding coils for said power relay operable when energized to hold said movable contact in a closed position to which it has been moved by one of said operating coils, a slow-to-release control relay, energizing circuits for said holding coils arranged to be closed by operation of said control relay, and energizing means for said control relay including means operable by said master relay to energize said control relay in each operating cycle of said master relay.

12. In a control apparatus, a master relay having slow-to-release characteristics affording a normal release period of substantially predetermined length, first and second secondary relays, first and second control circuits having individual switch means therein arranged for selective closure when said first or said second secondary relays respectively is rendered operative during such a release period of said master relay, means affording individual holding circuits for and rendered effective by the respective secondary relays when said such secondary relays are operated and governed by said master relay to release said secondary relays when said master relay releases, means rendered operative selectively by said secondary relays when one of said secondary relays is operated for reducing the release period of said master relay, a power relay having a pair of main operating coils connected respectively in said first and second control circuits and also having a normally open movable contact and a pair of stationary control contacts into engagement with which said normally open contact may be moved by selective energization of said main operating coils, holding means for said power relay operable to hold said movable contact in a closed position to which it has been moved by one of said operating coils, a slow-to-release control relay, control circuits for said holding means arranged to be closed by operation of said control relay, and energizing means for said control relay operable by said master relay to energize said control relay once each in each operating and releasing cycle of said master relay.

13. In a control apparatus for correlating the rotative speeds of relatively rotatable elements such as independently driven shafts to maintain a predetermined speed relationship therebetween, the combination of a master shaft and variable speed driving means therefor, a secondary shaft having a variable speed engine for driving the same, switch means including relatively rotatable parts associated with the respective shafts, circuit means electrically interconnecting said switch means and affording at least three control circuits so associated with said switches that variation from said predetermined relationship between the speeds of said shafts produces electrical impulses successively in said control circuits at a frequency indicative of the magnitude of such variance and in a sequency indicative of the sense of such variance, speed adjusting means for selectively adjusting the speed of said engine in two directions to correct such speed variance, control means responsive to the sequence and frequency of said electrical impulses to cause operation of said adjusting means in the proper direction to reduce the variance from the desired speed relationship of said shafts, and means including a slow-to-release relay operable under control of one of said control circuits when the detected speed variance exceeds a predetermined minimum to disable said speed adjusting means.

14. In a control apparatus for correlating the rotative speeds of relatively rotatable elements such as independently driven shafts to maintain a predetermined speed relationship therebetween, the combination of a master shaft and variable speed driving means therefor, a secondary shaft having a variable speed engine for driving the same, switch means including relatively rotatable parts associated with the respective shafts, circuit means electrically interconnecting said switch means and affording a main control circuit and two secondary control circuits so associated with said switches that variation from said predetermined relationship between the speeds of said shafts produces electrical impulses successively in said control circuits at a frequency indicative of the magnitude of such variance and in a sequence indicative of the sense of such variance, speed adjusting means for selectively adjusting the speed of said engine in two directions to correct such speed variance, control means responsive to the sequence and frequency of said electrical impulses to cause operation of said adjusting means in the proper direction to reduce the variance from the desired speed relationship of said shafts, and means responsive to the frequency of the electrical impulses in said main control circuit to render said speed adjusting means inoperative.

15. In a control apparatus for correlating the speeds of a master shaft and an independently driven secondary shaft to attain substantially a predetermined speed relationship therebetween, detecting means associated with said shafts to compare the speeds of said master and secondary shafts and including a master device effective when operated to retain its operated condition for a normal predetermined period, and two secondary devices, said devices being arranged for sequential operation at a frequency determined by the magnitude of the variance from said predetermined speed relationship and in different sequence according to the sense of such variance, adjusting means operable in opposite directions to variably adjust the operating speed of said secondary shaft, means controlled by said detecting means and effective to operate said adjusting means in one direction for increasing the speed of said secondary shaft when one of said secondary devices is operated while said master device is in its operated condition, other means controlled by said detecting means and effective to operate said adjusting means in the opposite direction for decreasing the speed of said secondary shaft when the second of said secondary devices is operated while said master device is in its operated condition, means governed by said master device and operable in response to a speed differential greater than a predetermined amount to disable such speed adjusting means, and manual means operable to restore said speed adjusting means to an operative condition and to maintain said speed adjusting means in continuous operation until said speed differential has been reduced to said predetermined amount.

16. In a control apparatus for correlating the speeds of a master shaft and an independently driven secondary shaft to attain substantially a predetermined speed relationship therebetween, detecting means associated with said shafts to compare the speeds of said master and secondary shafts and including a master device effective when operated to retain its operated condition for a normal predetermined period and two secondary devices, said devices being arranged for sequential operation at a frequency determined by the magnitude of the variance from said predetermined speed relationship and in different sequence according to the sense of such variance, adjusting means operable in opposite directions to variably adjust the operating speed of said secondary shaft, power control means controlled by said detecting means and effective to operate said adjusting means in one direction for increasing the speed of said secondary shaft when one of said secondary devices is operated while said master device is in its operated condition, other power control means controlled by said detecting means and effective to operate said adjusting means in the opposite direction for decreasing the speed of said secondary shaft when the second of said secondary devices is operated while said master device is in its operated condition, electrically operable holding means operable to hold said power control means in operated condition, a slow-to-release control relay, an energizing condenser for said control relay, switch means governed by said master device and operable in each cycle of operation of said master device to connect said condenser to a charging source and then to disconnect said source and connect said condenser to said governing relay so as to thereby operate said control relay when the detected speed variance exceeds a predetermined amount, a governing relay arranged to be energized when said control relay is energized, a manual control switch, a holding circuit for said governing relay including contacts of said control relay, said governing relay having normally closed contacts effective when opened to disable said adjusting means, and switch contacts forming part of said manual switch and arranged for closure by operation of said manual switch to energize said holding means.

17. In a control apparatus for correlating the speed of an independently driven secondary shaft with the speed of a master shaft to attain substantially a predetermined speed relationship therebetween, detecting means operable to compare the speeds of said shafts, adjusting means operable selectively to adjust the speed of said secondary shaft in either direction as required to establish such predetermined relation, a primary governing means normally operable under control of said detecting means to operate said adjusting means in the proper direction to reduce any detected speed variance by a succession of spaced adjusting periods that vary in length in accordance with and in substantially direct proportion to the magnitude of such detected speed variance, a second governing means operable under joint control of said detecting means and said primary governing means and effective when the detected speed variance exceeds a predetermined amount to disable said primary governing means, and a manual governing means effective when operated to restore said primary governing means to an effective relation and to maintain said speed adjusting means in continuous operation while said speed variance exceeds said predetermined amount.

18. In a control aparatus for correlating the speed of an independently driven secondary shaft with the speed of a master shaft to attain substantially a predetermined speed relationship therebetween, detecting means operable to compare the speeds of said shafts, adjusting means operable selectively to adjust the speed of said secondary shaft in either direction to establish such predetermined relation, a primary governing means normally operable under control of said detecting means to operate said adjusting means in the proper direction to reduce any detected speed variance by a succession of spaced adjusting periods that vary in length in accordance with the magnitude of such detected speed variance, and a second governing means operable under control of said detecting means and effective when the detected speed variance exceeds a predetermined amount to dominate the controlling action of said primary governing means.

ROSSER L. WILSON.

No references cited.